United States Patent Office 3,290,245
Patented Dec. 6, 1966

3,290,245
LUBRICATING COMPOSITIONS CONTAINING AMINE TUNGSTATES
John Scotchford Elliott and Eric Descamp Edwards, London, England, assignors to Castrol Limited, a British company
No Drawing. Filed June 3, 1960, Ser. No. 33,618
Claims priority, application Great Britain, June 5, 1959, 19,370/59; Apr. 14, 1960, 13,454/60
11 Claims. (Cl. 252—32.7)

The invention relates to lubricating oil additives and lubricating compositions containing such additives.

According to the present invention there is provided a salt of a molybdic acid or tungstic acid and an amine having the formula:

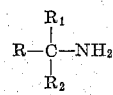

wherein $R_1$ and $R_2$ are the same or different straight chain alkyl radicals having up to 4 carbon atoms in the radical and R is an alkyl radical, the radicals R, $R_1$ and $R_2$ being such that the total number of carbon atoms in the amine is from 16 to 50. Preferably the radicals $R_1$ and $R_2$ are both methyl radicals, and the total number of carbon atoms in the amine is from 18 to 22.

Specific examples of the new salts are:

Primene JM-T molybdate
Primene JM-T paramolybdate
Primene JM-T tungstate
t-Octadecylamine molybdate
t-eicosylamine molybdate
t-Octadecylamine tungstate
1-methyl-1-ethyl octadecylamine molybdate
1,1-dimethyl octadecylamine molybdate
1-methyl-1-butyl hexadecylamine molybdate
t-Triacontylamine molybdate Preferred salts are those of Primene JM-T, a commercially available material consisting essentially of a mixture of tertiary alkyl primary amines having the above formula, where $R_1$ and $R_2$ are methyl radicals and R represents a mixture of branched-chain alkyl radicals containing principally from 15 to 19 carbon atoms. In general, for use as additives for lubricating oil compositions, salts of molybdic acid are preferred.

By the fractional distillation of Primene JM-T under reduced pressure, cuts boiling over a narrow range can be obtained containing amines or mixtures of isomeric amines having a definite neutral equivalent, corresponding, for example, to t-octadecylamine and t-eicosylamine.

The salt of a molybdic acid and tungstic acid may be made by heating the amine and molybdic acid or ammonium tungstate in the presence of water to form the salt and subsequently removing excess water and isolating the salt. The molybdic acid and the ammonium tungstate may, of course, be formed in the reaction mixture. When the salt is a molybdate it is preferably made by heating equivalent amounts of the amine and molybdic acid at a temperature between 50° C. and 80° C. in the presence of water, the mixture being stirred to dissolve the molybdic acid. The salt may be isolated by solvent extraction from the mixture and removing the solvent by evaporation. The salt may be prepared directly in a mineral oil by heating equivalent amounts of the amine dissolved in a mineral oil and molybdic acid at a temperature between 50° C. and 80° C. in the presence of water, the mixture being stirred to dissolve the molybdic acid and subsequently removing water from the product to form the salt dissolved in the oil. Tungstates are preferably prepared by heating equivalent amounts of the amine and ammonium tungstate in the presence of aqueous ammonia under reflux while passing a stream of nitrogen through the reaction mixture until the reaction is substantially complete, distilling water and ammonia from the mixture and finally drying the product by blowing nitrogen through it at a temperature of about 100° C.

The invention also includes lubricating compositions comprising a major proportion of a lubricating oil and a minor proportion, e.g. from 0.5 to 10% by weight on the weight of the composition, of a salt soluble in the lubricating oil of molybdic or tungstic acid and the above-defined amines.

The production of organic nitrogen base molybdates and tungstates which are soluble in hydrocarbon oils has proved to be an extremely difficult matter. Thus we have found that whereas the molybdates and tungstates of the present invention are freely miscible with hydrocarbon oils and are comparatively stable substances, the corresponding compounds derived from other nitrogen bases, e.g. high molecular weight primary and secondary straight chain amines and even the N-methyl and N,N-dimethyl derivatives of Primene JM-T, are oil-insoluble substances which appear to have a complex structure or alternatively to be highly unstable.

We have also found that even when molybdates of tertiary alkyl primary amines are prepared, a certain minimum number of carbon atoms is necessary to ensure adequate oil-solubility. Thus, for example, molybdates prepared from the closely related commercially available amine Primene 81-R have been found to be but sparingly soluble in hydrocarbon oils. In this instance, $R_1$ and $R_2$ are methyl radicals and R represents a mixture of branched-chain alkyl radicals containing principally from 9 to 11 carbon atoms.

Lubricating compositions containing a lubricating oil and a proportion of the salt of the above-defined amines and a molybdic or tungstic acid, may contain a wide range of proportions of the salt depending upon the particular application of the lubricating composition. However, in compositions where this new lubricant additive is employed as a cold sludge dispersant, the additive may be present in amounts of from 0.2 to 5 percent and preferably from 0.4 to 2 percent by weight on the weight of the composition.

According to the present invention there is also provided a lubricating composition comprising a major proportion of a mineral oil of lubricating viscosity and a minor proportion of a combination of two additives, the first additive being a salt of molybdic acid or tungstic acid and above-defined amines and the second additive being elementary sulphur or an organic compound soluble in the lubricating oil containing divalent sulphur and capable of decomposing at temperatures produced locally by friction under boundary lubricating conditions at metal surfaces to cause the formation of a friction reducing molybdenum or tungsten compound.

The sulphur containing compound is preferably a zinc dialkyl dithiophosphate which may have alkyl groups having a total number of carbon atoms in the alkyl groups of from 6 to 36. However, examples of other classes which may be employed as the second additive are:

Organic disulphides, and organic polysulphides, such as tri-sulphides
Organic xanthates and thiocarbonates
Organic thiocarbamates e.g. dithiocarbamates
Organic thiocyanates
Organic thioureas Furthermore, the organic sulphur-containing compound may be one of various sulphurised materials, such as sulphurised fatty oils or sulphurised terpenes.

Preferred types of the second additive are the oil-soluble metal salts of organic dithiophosphoric acids e.g. zinc or barium dialkyl dithiophosphates. These additives, the use of which in lubricating oils has been well known for many years, confer valuable oxidation and corrosion resistance to the oils in which they are dissolved and also enhance the load-carrying capacity. Other types of compounds containing both sulphur and phosphorus may be employed, if desired, e.g. derivatives of organic thiophosphoric, thiophosphorous, thiophosphonic and thiophosphinic acids. Also, phosphorised sulphurised terpenes or other unsaturated compounds may be used. Specific examples of these compounds are:

Zinc dihexyl dithiophosphate (zinc di(4-methyl-2-pentyl) dithiophosphate)
Zinc dihexyl/diisopropyl mixed dithiophosphate
Zinc dicapryl dithiophosphate
Barium dilauryl dithiophosphate
Tributyl thionophosphate
Triphenyl phosphine sulphide
Ethylenebis (dihexyl dithiophosphate)
Dihexyl dithiophosphate disulphide
2-ethyl hexyl diphenyl dithiophosphinate
$P_4S_3$-treated turpentine
Zinc dilauryl dithiophosphate
Phosphorized sulphurized sperm oil
Dibenzyl disulphide
Dibenzyl trisulphide
Phosphorized sulphurized α-pinene
Dilauryl trisulphide
Di-n-butyl trithiodiacetate
Benzyl thiocyanate
Zinc di-n-butyl dithiocarbamate
Sulphurized sperm oil
n-Butyl dimethyldithiocarbamyl acetate The two additives may be employed in the compositions in a wide range of proportions depending on the application of the lubricating composition.

The salt of a molybdic acid or tunstic acid and the amine is preferably present in an amount to provide a molybdenum or tungsten content based on the total weight of the composition of from 0.005 to 0.5 percent by weight. The sulphur or organic sulphur compound may be present in an amount to provide a sulphur content based on the total weight of the composition of from 0.06 to 5 percent by weight, and is preferably present in an amount to provide a sulphur content of from 0.1 to 0.5 percent by weight.

Various other additives may also be present in the compositions according to the invention, e.g. viscosity index improvers (e.g. polybutenes, polymethacrylates), pour point depressants, and antioxidants (e.g. secondary aromatic amines and phenols). However, care should be taken, when compounding a lubricating composition in accordance with the invention, that no conventional additives are included which have the effect of substantially reducing the friction reducing properties of a composition containing a salt of molybdic or tungstic acid and sulphur or a sulphur containing compound.

The compositions may also include detergents, such as salts of petroleum and alkyl benzene or naphthalene sulphonic acids, e.g.

Basic barium petroleum sulphonate
Basic calcium petroleum sulphonate
Tin petroleum sulphonate
Barium dinonyl naphthalene sulphonate
Basic barium didodecyl benzene sulphonate Also carbonated basic barium or calcium salts of petroleum sulphonic acids may be used or metal phenates or phenol sulphides, e.g. barium di-t-octyl phenol sulphide.

A basic alkaline earth metal petroleum sulphonate may be present in the composition in a small proportion, e.g. from 0.1 to 10 percent by weight on the weight of the composition.

A particular preferred composition in accordance with the invention is a lubricating composition comprising a major proportion of a mineral oil of lubricating viscosity and a molybdate of an amine having the formula:

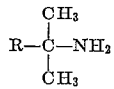

where R is an alkyl radical having from 15 to 19 carbon atoms, the molybdate being present in an amount to provide a molybdenum content of from 0.01 to 0.1 percent by weight, a zinc dialkyl dithiophosphate having a total of from 6 to 24 carbon atoms in the alkyl radicals present in an amount to provide from 0.1 to 0.2 percent by weight of sulphur in the composition, and from 0.5 to 3.0 percent by weight of a basic alkaline earth metal petroleum sulphonate derived from a petroleum sulphonic acid having a molecular weight of from 400 to 600, the weights being based upon the total weight of the composition.

The new compounds of the present invention are of particular utility in lubricating oils for internal combustion engines, both petrol and diesel engines, and have valuable sludge dispersing properties. They are particularly effective dispersants of the so-called "cold sludge" which tends to form in certain types of engine in cold weather. This form of sludge, which is produced as the result of the ingress of water and fuel combustion products into the crankcase oil, is a particular problem in engines which are operated intermittently for short periods or more continuously at only a fraction of their maximum power output. It may appear on pistons and around piston rings as resinous deposits resulting in reduced efficiency of the engine, or it may appear as a stiff emulsion in the sump or on the timing cover.

It has previously been proposed to use colloidal dispersions of molybdenum disulphide in lubricating oils in order to reduce friction and in cutting and metal working oils to prevent metal pick-up and increase tool life. A great disadvantage of such colloidal dispersions is, however, their tendency to separate or coagulate on storage or in use. Such separation would be particularly undesirable in an internal combustion engine, where the blockage of oil passages and filters would be liable to result.

Another disadvantage in the use of colloidal dispersions of molybdenum disulphide is that only those particles which are orientated against the metal surfaces to be lubricated and held there by polar forces will actually effect the desired reduction in coefficient of friction. These will only constitute a small proportion of the total particles present. Furthermore, some time is needed before the necessary orientation takes place and therefore, a period of running-in is necessary before the benefit of the presence of the molybdenum disulphide is felt.

The use of an oil-soluble molybdenum compound would, of course, overcome the separation difficulty and if it could be so arranged that this compound would produce friction reducing molybdenum compounds only in small quantities where needed, i.e. under boundary lubrication conditions at the metal surfaces, it would obviously be highly desirable.

It has been proposed to employ as additives for lubricating oils certain organic compounds containing both molybdenum and sulphur, e.g. molybdic xanthates. Many of these compounds, soluble in mineral lubricating oils, although possessing very good extreme pressure properties, have the disadvantage of decomposing at relatively low temperatures and would, therefore, if used in lubricants for internal combustion engine oils, be liable to throw down objectionable deposits in the sump.

Under boundary lubricating conditions frequently present in practice, lubricating compositions may become heated to temperatures of 200° C., or even higher, and at these temperatures the sulphur or sulphur-containing organic compound, or a decomposition product thereof, reacts with the molybdic acid salt or the tungstic acid salt or a decomposition product thereof, to form at least one friction reducing molybdenum or tungsten compound, such as the sulphide or oxysulphide. By use of the compositions according to this invention containing a molybdenum or tungsten compound and sulphur or a sulphur-containing organic compound, a friction-reducing molybdenum or tungsten compound is produced in small quantities where needed.

While the new compounds of the invention may be used as the sole additives in lubricating oils for internal combustion engines, they are preferably employed in conjunction with conventional detergent and antioxidant additives. A particularly preferred combination of additives comprises Primene JM–T molybdate, a basic alkaline earth metal petroleum sulphonate and a zinc di-alkyl dithiophosphate. Lubricating compositions containing these three additives have the following combination of desirable properties:

(1) Cold sludge dispersant properties imparted by the molybdate;

(2) Improved high temperature detergency resulting from the co-operation of the molybdate with the metal sulphonate; and (3) Valuable anti-friction properties resulting from the interaction of the molybdate and the zinc dithiophosate with the resulting formation of molybdenum disulphide or oxysulphides locally under boundary lubrication conditions.

When the compounds of the present invention are employed in conjunction with sulphur or relatively active sulphur compounds, e.g. zinc dialkyl dithiophosphates, it is preferred to have present also a detergent additive, e.g. a basic alkaline earth metal sulphonate, as otherwise there is a tendency for a little oil insoluble sludge to form at elevated temperatures due to interaction between the additives in the bulk of the oil.

The compounds of the present invention may be used, preferably in conjunction with organic sulphur compounds of the type described, in gear lubricants, e.g. in the gearboxes of cars or in lubricants for industrial gears. They may also be added to conventional hypoid gear lubricants to obtain a reduction in frictional characteristics. In this connection it will be apparent to those skilled in the art that certain additives of an acidic nature, present in some hypoid gear oils, may react with the compounds of the present invention precipitating molybdic or tungstic acid. Care is, therefore, needed in the selection of additives for use in conjunction with the additives of the present invention.

The compounds of the present invention may also be added to cutting and metal working oils containing sulphur or sulphur-containing compounds to prevent metal pick-up and increase tool life. Such oils may, if desired, contain additional compounds such as chlorine and phosphorus-bearing compounds. The invention also includes, therefore cutting or metal working oils containing a minor proportion of a salt of a molybdic or tungstic acid and the above-defined amine.

The organic compound containing divalent sulphur and capable of decomposing at temperatures produced locally by friction under boundary lubricating conditions at metal surfaces may, in general, be selected by slowly heating the substance in the presence of a piece of copper foil. If blackening of the copper takes place below 150° C., or preferably below 120° C., the compound is sufficiently reactive to provide the required molybdenum or tungsten di- or oxy-sulphide were required. However, it must be pointed out that there are notable exceptions to this test; in particular metal salts of sulphur-containing acids, such as zinc dialkyl dithiophosphates and zinc dialkyl dithiocarbamates, which, though sufficiently reactive at these temperatures, do not blacken copper when used in the foregoing test, because (it is suggested) metal sulphides are formed as the result of the thermal decomposition rather than free sulphur.

Following is a description by way of example of methods of preparing the new compounds of the present invention.

EXAMPLE I

*Preparation of Primene JM–T molybdate—*
$(RNH_3)_2MoO_4$

Into a 250 ml. two-necked round-bottomed flask were placed 70.8 grams (0.2 mol) of Primene JM–T and 16.2 grams (0.1 mol) of molybdic acid ($H_2MoO_4$). The mixture was heated to 60° C. on a water-bath and rapidly stirred with a glass paddle stirrer.

Distilled water was added from a burette at the rate of 1 ml. every five minutes, the mixture being stirred at 60° C. When 11 mls. of water had been added, all the molybdic acid had disappeared and stirring was continued for one hour at 60° C. to ensure complete reaction. The product was dried at 100° C. by blowing with nitrogen and was obtained as a clear amber viscous liquid containing 11.7% molybdenum (theoretical percent Mo 11.04).

EXAMPLE II

*Preparation of Primene JM–T molybdate in mineral oil*

Into a 1-litre, three-necked creased flask, fitted with a thermometer and a glass paddle stirrer were placed 119.7 grams (about 0.34 mol) of Primene JM–T and 148 grams of a light mineral oil of viscosity about 65 seconds Redwood I at 140° F.

The mixture was heated to 75° C. with rapid stirring and 31.07 grams (0.193 mol) of powdered molybdic acid was then added, followed by 20 ml. of distilled water.

The molybdic acid dissolved during a period of approximately 10 minutes, after which stirring was continued for a further 45 minutes at 75° C. to complete the reaction. A further 296 grams of the mineral oil were now added and stirring continued for a further 15 minutes.

The mixture was then allowed to cool, decanted from the flask and centrifuged in 500 ml. polythene buckets at 1500 r.p.m. for 25 minutes. The upper oil layer was clear and bright and was separated by decantation from the lower aqueous layer which contained a little unreacted molybdic acid and dried by stripping under reduced pressure, at 70° C., and 100 mms. Hg pressure.

The product, which consisted of an approximately 25% solution of Primene JM–T molybdate in the mineral oil, contained 2.60% molybdenum.

EXAMPLE III

*Preparation of Primene JM–T tungstate*

Into a 700 ml. flask fitted with a nitrogen inlet, reflux condenser and vibro-stirrer unit, were placed 70.8 grams (0.2 mol) of Primene JM–T and 25 grams (0.1 mol) of β-tungstic acid, $H_2WoO_4$, dissolved in aqueous amonia (250 mls. of a 50% solution of 0.880 ammonia in water). The mixture was heated with vigorous stirring under reflux in an oil bath maintained at 110° C. for 2 hours, a stream of nitrogen being blown through the reaction mixture to remove the ammonia.

The water and excess ammonia were then distilled out from the system, the product being finally dried by nitrogen blowing at 100° C.

Primene JM–T tungstate was thus obtained as a viscous yellow-green liquid containing 19.2% W (theoretical percent W 19.2).

EXAMPLE IV

*Preparation of Primene JM–T paramolybdate*

Into a beaker were placed 17.7 gms. (0.05 mol) of Primene JM–T, 16.2 gms. (0.1 mol) of molybdic acid, $H_2MoO_4$, and 50 ml. of water.

The mixture was vigorously stirred on a hot plate and the water driven off by evaporation.

Mineral Oil A (55 grams) was now added to dissolve the product which was then filtered from a fair quantity of excess molybdic acid. The product was finally dried in the manner described in Example II.

The Primene JM–T paramolybdate $(R.NH_3)_6Mo_7O_{24}$ was thus obtained as an approximately 32.5% solution in Mineral Oil A.

It contained 7.04% Mo (calculated 7.18% Mo).

EXAMPLE V

Primene JM–T was fractionally distilled through a 50 x 2 cm. column packed with Fenske helics and fitted with a reflux ratio divider and ancillary equipment. The column was heated externally and continuous fractionation was carried out at 5 mms. Hg pressure, a series of narrow boiling range cuts being obtained. The neutral equivalents of these cuts were determined and they were also subjected to analysis by gas chromatography, as the result of which it appeared that several of the cuts were single compounds.

Molybdates were prepared from selected cuts by the procedure outlined in Example I, details of the cuts selected being set forth in Table I.

The molybdates from all these cuts were found to be soluble in mineral lubricating oil.

mls. of a light spindle oil having dissolved therein the compound under test on an automatic shaking machine and then poured into a measuring cylinder with a tapered base which was allowed to stand in an oven at 60° C.

The cylinder was removed from the oven periodically and examined for signs of separation of the sludge. Changes in the colour of the oil proved to be the most reliable indication of sludge separation, the colour changing from black or blue (depending on the sample of sludge used) through grey, brown and speckled (in that order) to that of the clear oil. When the sludge was completely dispersed, the oil was black or blue.

The results of the cold sludge tests are summarised in Table II.

TABLE II
[Laboratory cold sludge dispersion tests]

| Test No. | Additives Present | Appearance of sludge dispersion after— | | | | |
|---|---|---|---|---|---|---|
| | | 2 hours | 6 hours | 1 day | 3 days | 7 days |
| 1 | None (plain oil) | Brown | Speckled | Clear oil | | |
| 2 | Primene JM–T mol. bdate (0.2%) | Blue | Blue | Speckled | Speckled | Speckled. |
| 3 | Primene JM–T molybdate (0.5%) | Black | Black | Black | Blue | Clear oil. |
| 4 | Primene JM–T molybdate (1.0%) | Blue | Blue | Blue | do | Blue. |
| 5 | Primene JM–T molybdate (2.0%) | Black | Black | Black | do | Do. |
| 6 | Primene JM–T molybdate (5.0%) | Blue | Blue | Blue | do | Speckled. |
| 7 | Primene JM–T tungstate (1.0%) | do | do | do | do | Blue. |
| 8 | Molybdate from distillate cut No. 12 from Primene JM–T (Example V) (1.0%) | do | do | Blue | do | Do. |
| 9 | Primene JM–T (2.0%) | do | do | Speckled | Clear oil | |
| 10 | Additive X (0.5%) | Black | Black | Black | Blue | Do. |
| 11 | Additive Y (2.0%) | do | Blue | Blue | do | Do. |
| 12 | Additive Z (2.0%) | do | Black | Black | do | Do. |

Additive X was a nitrogen bearing polymethacrylate type viscosity index improver and cold sludge dispersant known as Plexol 966, whilst Additive Z was a similar material marketed as Plexol 917 ("Plexol" is a Registered Trademark). Additive Y was a commercially available fatty methacrylate/diethylamino methyl methacrylate copolymer. These three additives were known to be effective cold sludge dispersants in service.

Further confirmation of the cold sludge dispersant properties of Primene JM–T molybdate was obtained

TABLE I

| Cut No. | Indicated No. of components from gas liquid chromatographic analysis | Boiling range (5 mm.) (° C.) | Percent of original sample | Neutral equivalent | Percent N |
|---|---|---|---|---|---|
| 9 | 1 | 117–119 | 2.7 | 412 | 4.51 |
| 12 | 1 | 130–134 | 11.9 | 321 | 4.29 |
| 13 | 1 | 136–140 | 9.0 | 286 | 4.76 |
| 14 | 1 | 140–144 | 10.2 | 292 | |
| 16 | 1 | 152–156 | 6.3 | 392 | |

The neutral equivalent was determined by adding to the amine in alcoholic solution an excess of hydrochloric acid and back-titrating with an aqueous solution of potassium hydroxide, employing bromo-thymol blue as the indicator.

The following is a description by way of example of compositions in accordance with the invention and of test data illustrating the performance of these compositions; comparative test data is also included.

A series of tests were carried out to illustrate the valuable detergent and sludge dispersant properties of the new compounds of this invention. A simple laboratory test, designed to obtain information regarding the "cold sludge (1 gram) was shaken for 30 minutes with 20 was performed in the following manner.

A quantity of "cold sludge" was collected from a Lauson engine which had been run deliberately under low temperature conditions using a leaded petrol and a plain mineral oil free from detergent additives, as the lubricant. This sludge was an emulsion containing about 33% of water, 1.3% of lead and 4.0% of matter insoluble in benzene, all percentages being by weight. The sludge (1 gram) was shaken for 30 minutes with 20 using a standard H.2 type Lauson engine, operating under the following conditions:

| | Part A | Part B | Part C |
|---|---|---|---|
| Speed, r.p.m. | 700 | 1,840 | 1,840 |
| Water outlet, ° F | 125 | 100 | 210 |
| Fuel flow, time (seconds) per 25 cc | 235±5 | 60±2 | 60±2 |
| Ignition timing, degrees below top dead centre | 5 | 25 | 25 |
| Sump oil temperature ° F | [1] 85 | [1] 90 | [2] 180 |
| Crankcase exhaust differential, inches of water | 3 | 5 | 5 |
| Duration hours | 5 | 5 | 50 |

[1] Approx. (uncontrolled).
[2] Controlled.

The total duration of the test was 100 hours, Parts A and B being run for five hours each alternatively for the first 50 hours and Part C straight through for the remaining 50 hours. Throughout the test, instead of normal crankcase ventilation, exhaust gas was fed in from a by-pass into the crankcase breather at a slight pressure.

Under these test conditions substantial quantities of cold sludge were produced, the cleanliness of the engine being assessed on the basis of the weight of sludge on the tappet cover and the appearance of the tappet cover and front cover. The latter were assigned a merit rating in which 10.0 represents a perfectly clean cover and 0 a completely sludged cover.

Results of tests under these conditions are summarised in Table III.

TABLE III

Lauson engine tests

| No. | Oil Blend | Tappet Cover | | Front cover Merit rating |
|---|---|---|---|---|
| | | Weight of sludge (grams) | Merit Rating | |
| 1 | Mineral Oil A | 2.3 | 5.4 | 5.7 |
| 2 | Oil A plus 0.5% Primene JM-T molybdate. | 0.4 | 7.5 | 8.2 |
| 3 | Oil A plus 3.0% Additive Z | 0.2 | 8.0 | 8.3 |

Primene JM-T molybdate, even at 0.5% concentration, therefore, produced a marked improvement in engine cleanliness under these test conditions.

Mineral oil A was a solvent-refined mineral oil of viscosity about 160 seconds Redwood I at 140° F.

To demonstrate the effect of the new salts of the present invention, when used in conjunction with sulphur or various organic divalent sulphur compounds, tests were carried out on the well known Four Ball machine similar to that described by Boerlage in "Engineering," July 13, 1933, volume 136, page 46. This apparatus comprised four steel balls arranged in the form of a pyramid. The top ball was held in a chuck attached to a spindle rotating at approximately 1500 r.p.m. and pressed against the three bottom balls clamped in a stationary ball holder. The balls were immersed in the oil to be tested.

Tests were run for one or two hours duration at a fixed load, the normal friction recording drum being replaced by a drum which made one complete revolution per hour.

It was observed that, in general, the coefficient of dynamic friction settled down to a steady value after a period of fluctuation following seizure of the balls. This value was dependent on the composition of the oil and the load, as was also the time taken for the steady value to be reached. The coefficient of friction "$f$" was calculated from the height of the friction trace above the base line.

In Table IV are listed the results of a number of experiments in which Primene JM-T molybdate (Additive A) was tested under the above conditions in a mineral lubricating oil in conjunction with a variety of sulphur-containing compounds (Additive B) at a fixed load (115 kg.) for one hour.

It will be seen from Table IV that in all cases a very substantial reduction in the coefficient of friction was obtained as the result of the conjoint use of the combination of two additives.

The mineral lubricating oil used in the experiments listed in Table IV (Mineral Oil B) was a blend of about 79% by weight of a mineral oil of viscosity about 100 seconds Redwood I at 140° F. and about 21% by weight of a solvent refined mineral oil of viscosity about 65 seconds Redwood I at 140° F.

TABLE IV

[Four ball friction test data (1 hour tests) load 115 kg.)]

| Test No. | Additive A (Percent) | Additive B | Percent Mo | Percent S | Coefficient of friction "$f$" | Percentage decrease in "$f$" over— | |
|---|---|---|---|---|---|---|---|
| | | | | | | Base oil | Oil plus additive "B" |
| 1 | None | None (Base oil alone) | | | 0.132 | | |
| 2 | 0.5 | None | 0.055 | | [1] 0.136 | None (increase) | |
| 3 | None | Sulphur (0.5%) | | 0.5 | 0.218 | do | |
| 4 | 0.5 | Sulphur (0.25%) | 0.055 | 0.25 | 0.073 | 45 | 67 |
| 5 | None | Di-n-butyl trithiodiacetate (1.7%) | | 0.5 | 0.127 | 4 | |
| 6 | 0.5 | Di-n-butyl trithiodiacetate (0.85%) | 0.055 | 0.25 | 0.082 | 30 | 35 |
| 7 | None | Benzyl thiocyanate (2.33%) | | 0.5 | 0.150 | None (increase) | |
| 8 | 0.5 | Benzyl thiocyanate (1.67%) | 0.055 | 0.25 | 0.041 | 69 | 73 |
| 9 | None | n-Butyl dimethyl dithiocarbamyl acetate (1.8%). | | 0.5 | 0.118 | 11 | |
| 10 | 0.5 | n-Butyl dimethyl dithiocarbamyl acetate (0.9%). | 0.055 | 0.25 | 0.073 | 45 | 38 |
| 11 | None | Zinc di-n-butyl dithio carbamate (1.42%) | | 0.5 | 0.145 | None (increase) | |
| 12 | 0.5 | Zinc di-n-butyl dithio carbamate (0.71%) | 0.055 | 0.25 | 0.048 | 64 | 67 |
| 13 | None | Sulphurized sperm oil (3.45%) | | 0.5 | 0.114 | 14 | |
| 14 | 0.5 | Sulphurized sperm oil (1.73%) | 0.055 | 0.25 | 0.064 | 52 | 44 |
| 15 | None | Tributyl thionophosphate (2.25%) | | 0.26 | 0.150 | None (increase) | |
| 16 | 0.5 | Tributyl thionophosphate (1.125%) | 0.055 | 0.13 | 0.082 | 38 | 45 |
| 17 | None | Triphenyl phosphine sulphide (1.0%) | | 0.25 | 0.155 | None (increase) | |
| 18 | 0.5 | Triphenyl phosphine sulphide (0.5%) | 0.055 | 0.13 | 0.064 | 52 | 44 |

[1] When steady.

In Table V are summarised the results of a further series of tests carried out on the Four-ball machine under the same conditions, but at a series of different loads, the tests being of two hours duration.

In this series of tests, Primene JM-T molybdate (Additive A) was added in two different concentrations to a typical S.A.E. 20W/30 motor oil based on Mineral Oil B and containing 2.5% of a commercially available polymethacrylate viscosity index improver concentrate, 1.2% of basic barium petroleum sulphonate (approx. 45% solution in mineral oil) and 0.7% of an oil concentrate of zinc dihexyl/diisopropyl dithiophosphate containing about 8.0% of phosphorus. This motor oil is designated "Lubricant C."

It will be seen that in all cases a substantial reduction in the coefficient of friction was produced by the addition of the molybdate except at 40 kg. at which load no seizure took place with any of the oils.

TABLE V

[Four-ball friction test data (2 hour tests)—All blends based on "Lubricant C"]

| Test No. | Load (kg.) | Coefficient of friction "f" | | | Percentage decrease in "f" over Lubricant C at same load. | |
|---|---|---|---|---|---|---|
| | | Lubricant C | Lubricant C plus 0.5% Additive A | Lubricant C plus 1.0% Additive A | 0.5% A | 1.0% A |
| 1 | 40 | 0.043 | 0.043 | 0.037 | None | 14 |
| 2 | 60 | 0.101 | 0.055 | 0.064 | 46 | 37 |
| 3 | 75 | 0.142 | 0.083 | 0.074 | 42 | 48 |
| 4 | 95 | 0.132 | 0.091 | 0.068 | 31 | 49 |
| 5 | 115 | 0.136 | 0.059 | 0.073 | 57 | 46 |
| 6 | 130 | 0.144 | 0.068 | 0.036 | 53 | 75 |

In a further series of tests of one hour duration at a load of 115 kg., the effect of varying the proportions of Primene JM–T molybdate (Additive A) and of the same zinc dithiophosphate concentrate (referred to as "ZDP") was examined, the results being summarised in Table V. Mineral Oil B was used throughout as the base oil.

It was evident from these results that the limiting sulphur concentration necessary to provide a significant reduction in the coefficient of friction was of the order of 0.06%, whereas, provided an adequate amount of sulphur was present, significant reduction in the coefficient of friction could be achieved with as little as 0.005% of molybdenum.

Accordingly preferred amounts of molybdenum in a composition containing a salt of molybdic acid and the defined amine are from 0.005% to 0.5% by weight, preferably from 0.01% to 0.1% by weight, and preferred amounts of sulphur present by virtue of the presence of the sulphur-containing compounds are from 0.06% to 5% by weight preferably from 0.1% to 0.5% by weight, the weights being based on the total weight of the composition.

Further tests, in which increasing amounts of "ZDP" were added to Lubricant C, showed that no improvement in frictional characteristics could be brought about by this means, in the absence of the molybdate.

Further Four-ball friction test data are summarised in Table VIII illustrating the diverse combinations of additives which may be used.

TABLE VI

[Four-ball friction test data (1 hour tests at 115 kg.)—All blends based on mineral oil B]

| Test No. | Additive A (percent) | "ZDP" (percent) | Percent Mo | Percent S | Coefficient of friction "f" | Percentage decrease in "f" over base oil |
|---|---|---|---|---|---|---|
| 1 | None | None | | | 0.132 | |
| 2 | None | 0.7 | | 0.116 | 0.141 | None |
| 3 | 0.5 | 0.3 | 0.055 | 0.050 | 0.164 | None |
| 4 | 0.5 | 0.4 | 0.055 | 0.066 | ¹ 0.073 | 44 |
| 5 | 0.5 | 0.5 | 0.055 | 0.083 | ¹ 0.073 | 44 |
| 6 | 0.2 | 0.7 | 0.022 | 0.116 | 0.045 | 66 |
| 7 | 0.1 | 0.7 | 0.011 | 0.116 | 0.055 | |
| 8 | 0.05 | 0.7 | 0.0055 | 0.116 | 0.073/0.113 | 44/22 |
| 9 | 1.5 | 0.3 | 0.165 | 0.050 | 0.170 | None |

¹ Very variable.

TABLE VII

[Four-ball friction test data (1 hour tests at 115 kg.)]

| Test No. | Base oil or lubricant | Additive A | Additive B | Load (kg.) | Coefficient of friction "f" | Percent decrease in "f" over base oil or lubricant at same load |
|---|---|---|---|---|---|---|
| 1 | Mineral Oil B | None | None | 115 | 0.132 | |
| 2 | do | Primene JM–T paramolybdate (0.67%) | do | 115 | 0.214 | None |
| 3 | do | Primene JM–T paramolybdate (0.33%) | ZDP (0.7%) | 115 | 0.077 | 42 |
| 4 | do | Primene JM–T paramolybdate (0.13%) | ZDP (0.7%) | 115 | 0.037 | 72 |
| 5 | do | None | Di-n-butyl dithio diacetate (2.6%) | 115 | 0.114 | 14 |
| 6 | do | Primene JM–T molybdate (0.5%) | Di-n-butyl dithio diacetate (1.3%) | 115 | 0.079 | 40 |
| 7 | do | None | Di-n-hexyl disulphide (1.83%) | 115 | 0.127 | 4 |
| 8 | do | Primene JM–T molybdate (0.5%) | Di-n-hexyl disulphide (0.92%) | 115 | 0.091 | 28 |
| 9 | Lubricant C | None | | 95 | 0.132 | |
| 10 | do | do | | 130 | 0.144 | |
| 11 | do | Primene JM–T tungstate (0.5%) | | 95 | 0.118 | 11 |
| 12 | do | Primene JM–T tungstate (0.5%) | | 130 | 0.104 | 28 |

Further experiments were carried out on the well known Timken Extreme Pressure Lubricant testing machine described by West in the Journal of the Institute of Petroleum volume 32, page 207, (1946). In this machine a steel ring is caused to revolve under load in contact with a stationary steel block.

In the tests recorded in Table VIII a fixed load of 10 lbs. was employed, the test being run for 6 hours at this load and the ring and block weighed before and after the test. In one pair of tests (tests 2 and 4) the block temperature, measured by a thermocouple, was recorded at intervals throughout the test and plotted on a graph, interpolated values being given in the table.

It is thus evident from Table VIII that the presence of the molybdate in Lubricant C, which contained a zinc dithiophosphate, effected a significant reduction both in the wear of the block and in the temperature attained by it.

In a further experiment using the Four-ball machine and oil containing both Primene JM–T molybdate and a zinc dialkyl dithiophosphate was run for one minute at a load below that at which incipient seizure took place. The top ball was removed and washed with petroleum ether. A thin film of carbon was then deposited on the surface of the ball under vacuum. The metal surface was then etched away using 5% HCl and 5% HNO₃ in methylated spirits and the carbon film, with attached particles from the surface, was removed and examined under the electron microscope. The presence of molybdenum disulphide was thus established.

TABLE VIII

[Timken wear tests (6 hours at 10 lbs. load)—Weight change (mgs.) of block temperature (° F.)]

| Test No. | Oil | Ring | Block | After, hours— 1 | 2 | 6 |
|---|---|---|---|---|---|---|
| 1 | Lubricant C | +5.7 | −4.0 | | | |
| 2 | do | +6.7 | −11.2 | 128 | 134 | 136 |
| 3 | Lubricant C plus 1.0% Primene JM-T molybdate. | +0.3 | −1.8 | | | |
| 4 | do | +0.8 | +0.3 | 112 | 119 | 124 |

To demonstrate the effect of adding Primene JM-T molybdate to typical "heavy duty" oils suitable for the lubrication of I.C. engines, tests were carried out in standard Petter AV-1 engines.

The Petter AV-1 engine was run under the standard AT/40 procedure, conditions being as follows:

Fuel sulphur content _____ 0.4%.
Coolant outlet temperature _____ 160°±2 F.
Coolant inlet temperature, approximately _ 140° F.
Sump temperature _____ 150/165° F.
B.H.P. _____ 4.1.
Duration _____ 120 hours.

Ratings were awarded to the various engine parts on a demerit system, 0 being a preferably satisfactory or clean part and 10.0 representing the worst possible condition.

The principal ratings obtained are summarized in Table IX.

The heavy duty oil P consisted of a solvent refined mineral lubricating oil of viscosity about 160 seconds Redwood I at 140° F. containing dissolved therein 3.7% by weight of approximately 45% concentrate of basic barium petroleum sulphonate and about 0.75% of zinc dihexyl/diisopropyl mixed dithiophosphates.

This test gives a measure of the general detergency of an oil under comparatively high temperature conditions and it can be seen from the results set out in Table IX that the addition of the molybdate compound was clearly beneficial.

TABLE IX

| Oil | Total Rating A+B+C | Ring Sticking | Average ring groove carbon | Average ring groove lacquer/carbon (A) | Average land lacquer/carbon (B) | Piston skirt lacquer (C) |
|---|---|---|---|---|---|---|
| Heavy duty oil P ¹ | 12.3 | 0.0 | 0.04 | 6.1 | 5.4 | 0.8 |
| Oil P + 0.5% Primene JM-T Molybdate | 4.9 | 0.0 | 0.12 | 3.3 | 1.6 | 0.03 |
| Do.² | 5.0 | 0.0 | 0.0 | 1.9 | 3.1 | 0.0 |

¹ Typical figures.
² Repeat test.

We claim:
1. A lubricating composition comprising a major proportion of a mineral oil of lubricating viscosity and dissolved in said oil a salt of tungstic acid an amine having the general formula

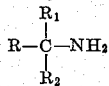

where R¹ and R² are both straight chain alkyl radicals having up to four carbon atoms in the radical and R is an alkyl radical, the radicals R, R¹ and R² being such that the total number of carbon atoms in the amine is from 16 to 50, said salt being present in an amount to provide a tungsten content of from 0.005 to 0.5 percent by weight on the total weight of the composition.

2. A composition as claimed in claim 1 wherein the total number of carbon atoms in the amine is from 18 to 22.

3. A composition as claimed in claim 1 wherein the radicals R₁ and R₂ are both methyl radicals.

4. A composition as claimed in claim 3 wherein the salt is present in an amount of from 0.4 to 2 percent by weight on the weight of the composition.

5. A composition as claimed in claim 1 which composition comprises a major proportion of a mineral oil of lubricating viscosity and a minor proportion of a combination of two additives, the first being a salt having the stated general formula, the second additive being selected from the group consisting of elementary sulphur and an organic sulphur compound containing divalent sulphur, said second additive being soluble in the oil and capable of reacting with the first additive at temperatures produced locally by friction under boundary lubricating conditions at metal surfaces, so as to form a friction-reducing sulphur-containing tungsten compound, said second additive being present in an amount to provide a sulphur content of from 0.06 to 5 percent by weight on the total weight of the composition.

6. A composition as claimed in claim 5 wherein the second additive is present in an amount to provide a sulphur content of from 0.1 to 0.5 percent by weight on the total weight of the composition.

7. A composition as claimed in claim 5 wherein said composition also contains from 0.1 to 10 percent by weight on the total weight of the composition, of a basic alkaline earth metal petroleum sulphonate.

8. A composition as claimed in claim 5 wherein the sulphur compound is a zinc dialkyl dithiophosphate.

9. A composition as claimed in claim 8 wherein the zinc dialkyl dithiophosphate has a total of from 6 to 24 carbon atoms in the alkyl radicals and the composition also contains from 0.1 to 10 percent by weight of a basic alkaline earth metal petroleum sulphonate.

10. A lubricating composition comprising a major proportion of a mineral oil of lubricating viscosity and dissolved in said oil a salt of tungstic acid and an amine having the general formula

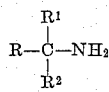

wherein R¹ and R² are both straight chain alkyl radicals having up to four carbon atoms in the radical and R is an alkyl radical, the radicals R, R¹ and R² being such that the total number of carbon atoms in the amine is from 16 to 50, said salt being present in an amount of from 0.2 to 5 percent by weight of the composition.

11. A lubricating composition comprising a major proportion of a mineral oil of lubricating viscosity and dissolved in said oil three additives (1) a salt of tungstic acid and an amine having the general formula

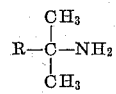

where R is an alkyl radical having from 15 to 19 carbon atoms being present in an amount to provide a molybdenum content of from 0.01 to 0.1 percent by weight, (2) a zinc dialkyl dithiophosphate having a total of from 6 to 24 carbon atoms in the alkyl radicals and being present in an amount to provide a sulphur content of from 0.1 to 0.2 percent by weight, and (3) from 0.5 to 3.0 percent by weight of a basic alkaline earth metal petroleum sulphonate derived from a petroleum sulphonic acid having a molecular weight of from 400 to 600, all percentages being based upon the total weight of the composition.

References Cited by the Examiner

UNITED STATES PATENTS

| | | | |
|---|---|---|---|
| 2,513,793 | 7/1950 | Frommel | 260—429 |
| 2,692,195 | 10/1954 | Hannum et al. | 260—438 |
| 2,795,549 | 6/1957 | Abbott et al. | 252—49.7 |
| 2,795,550 | 6/1957 | Harle et al. | 252—49.7 |
| 2,795,553 | 6/1957 | Lowe | 252—49.7 |
| 2,909,541 | 10/1959 | Hugel | 260—429 |
| 2,991,246 | 7/1961 | Kleinholz | 252—32.7 |

DANIEL E. WYMAN, *Primary Examiner.*

JULIUS GREENWALD, JOSEPH R. LIBERMAN, ALPHONSO D. SULLIVAN, JAMES S. BAILEY, *Examiners.*

G. O. ENOCKSON, R. E. HUTZ, P. P. GARVIN, *Examiners.*